(12) United States Patent
Hattori

(10) Patent No.: US 6,399,248 B1
(45) Date of Patent: Jun. 4, 2002

(54) SPINEL TYPE LITHIUM MANGANESE COMPLEX OXIDE AND LITHIUM SECONDARY BATTERY

(76) Inventor: Koji Hattori, c/o (A170) Intellectual Property Department, Murata Manufacturing Co., Ltd., 26-10, Tenjin 2-chome, Nagaokakyo-shi, Kyoto-fu 617-8555 (JP)

(*) Notice: Subject to any disclaimer, the term of this patent is extended or adjusted under 35 U.S.C. 154(b) by 0 days.

(21) Appl. No.: 09/450,610

(22) Filed: Nov. 30, 1999

(30) Foreign Application Priority Data

Dec. 2, 1998 (JP) .......................... 10-343060

(51) Int. Cl.$^7$ ................................. H01M 4/50
(52) U.S. Cl. .................... 429/224; 429/218.1; 423/599; 252/182.1
(58) Field of Search ............ 429/224, 231.95, 429/231.9, 218.1; 423/599, 594, 596; 252/182.1

(56) References Cited

U.S. PATENT DOCUMENTS

| | | | | |
|---|---|---|---|---|
| 5,316,877 A | * | 5/1994 | Thackeray et al. | 429/197 |
| 5,700,442 A | * | 12/1997 | Bloch et al. | 423/599 |
| 6,159,636 A | * | 12/2000 | Wang et al. | 429/223 |
| 6,168,888 B1 | * | 1/2001 | Iwata et al. | 429/231.95 |
| 6,183,910 B1 | * | 2/2001 | Praas et al. | 429/224 |

FOREIGN PATENT DOCUMENTS

| | | | | |
|---|---|---|---|---|
| EP | 814524 | * | 12/1997 | H01M/4/50 |
| EP | 820113 | * | 1/1998 | H01M/10/40 |
| EP | 854526 | * | 7/1998 | H01M/4/50 |
| JP | 7-282798 | | 10/1995 | |
| JP | 9-241024 | | 9/1997 | |
| JP | 10-21914 | | 1/1998 | |
| JP | 10152326 | * | 6/1998 | C01G/45/00 |
| JP | 1173962 | * | 3/1999 | H01M/4/58 |

* cited by examiner

*Primary Examiner*—Stephen Kalafut
*Assistant Examiner*—R Alejandro
(74) *Attorney, Agent, or Firm*—Dickstein Shapiro Morin & Oshinksy LLP

(57) ABSTRACT

A spinel type lithium manganese complex oxide consists essentially of Li, Mn and O, and is represented by a general formula $Li_xMn_2O_y$, where x satisfies $x \geq 1.04$ and y is in the ranges satisfying the following inequarities $y \geq 0.667x + 3.333$ $y \leq 1.333x + 2.667$ $y < 0.333x + 3.783$.

12 Claims, 2 Drawing Sheets

SPINEL TYPE LITHIUM MANGANESE COMPLEX OXIDE AND LITHIUM SECONDARY BATTERY

BACKGROUND OF THE INVENTION

1. Field of the Invention

The present invention relates to a spinel ($AB_2O_4$) type lithium manganese complex oxide which is used as a cathode active material in a lithium secondary battery, and also relates to a lithium battery formed by using the complex oxide.

2. Description of the Related Art

In recent years, there has been a trend to making electronic devices portable and cordless. As an electric power source for use in the electronic devices, there has been a strong demand for a secondary battery which is compact in size, light in weight and has a high energy density. There has been in practical use a non-aqueous electrolytic solution type lithium secondary battery as a secondary battery satisfying the above requirements.

As the cathode active material for use in the non-aqueous electrolytic solution type lithium secondary battery, some lithium-containing complex oxides such as lithium nickelate ($LiNiO_2$), lithium cobaltate ($LiCoO_2$), and lithium manganate ($LiMn_2O_4$) have been proposed, with the lithium cobaltate ($LiCoO_2$), and lithium manganate ($LiMn_2O_4$) already in practical use.

With a lithium secondary battery whose cathode active material is formed by a lithium manganate ($LiMn_2O_4$) coming from a manganese resource, which is more abundant than cobalt resource, one can use a cathode active material represented by $Li(Mn_{2-x}Li_x)O_4$ in which the part of the manganese site has been replaced by lithium or a cathode active material represented by $Li_{1+x}Mn_{2-x}O_4$ in which the atom ratio of lithium and manganese is within a predetermined range. As a result, it is possible to obtain a secondary battery which has a large initial electric discharge capacity and has an excellent cycle property ensuring that there would be no deterioration in discharge capacity even when the electric charge and discharge are repeated (Japanese Unexamined Patent Publication No. 7-282798 and Japanese Unexamined Patent Publication No. 9-241024).

However, with the above lithium secondary battery formed by using the above cathode active materials, although it has not been found that there is a considerable deterioration in its capacity when conducting a cycle of electric charge and discharge under conditions close to room temperature, if the cycle of electric charge and discharge is carried out at a temperature higher than 60° C., it has been found that the charge and discharge capacities are deteriorated to an extreme extent.

Further, as shown in the following equation (1) which may be used to calculate a theoretical capacity of a 4V area of a spinel type lithium manganate, with the lithium manganate represented by $Li(Mn_{2-x}Li_x)O_4$, a larger substitution amount x of substituting lithium for manganese, will cause the charge and discharge capacities to be reduced to a larger extent. For example, if the substitution amount x is 0.33, the lithium manganate will be $Li(Mn_{1.67}Li_{0.33})O_4 = Li_{1.33}Mn_{1.67}O_4 = Li_4Mn_5O_{12}$. At this moment, since an average valence of manganese becomes 4.0 and it is not possible at all to conduct an electric charge, its capacity will become 0 mAh/g.

$$\text{Theoretic Capacity} = (1-3x) \cdot (A \times E/3.6)/M \quad (1)$$

x: substitution amount for substituting lithium for manganese

A: Avogadro number

E: elementary electric charge

M: molecular weight of $Li(Mn_{2-x}Li_x)O_4$.

However, the inventors of the present invention found that a lithium manganate in which the manganese site has been displaced by lithium can produce a larger capacity than the above theoretic capacity calculated by the above equation.

The inventors of the present invention conducted a determination of mole ratio of lithium and manganese, and also carried out a titration of manganese, thereby correctly calculating mole ratios of lithium, manganese and oxygen. As a result, it was understood that the lithium manganate represented by $Li(Mn_{2-x}Li_x)O_4$ has a composition of $Li(Mn_{2-x}Li_x)O_{4-\delta}$, i.e., actually has an oxygen defect or deficiency.

A lithium manganate having an oxygen defect, $Li(Mn_{2-x}Li_x)O_{4-\delta}$ ($0 \leq x \leq 0.02$, $-0.015 \leq \delta \leq 0.012$) has been disclosed (Japanese Unexamined Patent Publication No. 10-21914). In the conventional solid phase method for synthesizing a lithium manganate in which the manganese site has been displaced by lithium, it has been shown that the lithium manganate was generated having a composition of $Li(Mn_{2-x}Li_x)O_{4-\delta}$ and having an oxygen defect, and that a larger amount of oxygen defect will cause a larger deterioration in the charge/discharge cycle property.

A lithium manganate having a predetermined range of oxygen defect has an excellent cycle property when the battery is charged or discharged at a temperature close to room temperature, but it has been found that the cycle property will be deteriorated rapidly if an electric charge or an electric discharge is conducted at a temperature (60° C.) which is higher than a room temperature.

The inventors of the present invention have noted the oxygen defect amounts before and after the deterioration of cycle property in charge and discharge, conducted an active and sufficient research, and finally found that such kind of lithium manganate will increase the oxygen defect amount when it is at a high temperature.

With the above lithium manganate where the manganese has an average valence of 3.505, it was found that at room temperature there was no deterioration in the charge and discharge cycle property, which deterioration will otherwise occur because of the Jahn-Teller effect. However, at a high temperature, the cathode active material will be chemically reduced so that an oxygen defect will occur. In order to compensate for electric charges, $Mn^{4+}$ is reduced to $Mn^{3+}$ and the average valence of manganese will become smaller than 3.5. Once the average valence becomes smaller than 3.5, the Jahn-Teller distortion will cause a phase transition in which a cubic system is changed into a tetragonal system, hence causing a considerable change in the volume thereof, resulting in a deterioration in the charge and discharge cycle property.

SUMMARY OF THE INVENTION

It is an object of the present invention to provide a spinel type lithium manganese complex oxide for use as a cathode active material in a lithium secondary battery, capable of solving the above problem associated with the conventional spinel type lithium manganese complex oxide, enabling the manganese to have an average valence of 3.5 or more, having a large electric charge and discharge capacity, having an excellent charge and discharge cycle property, in particular at a high temperature, and also to provide a lithium secondary battery having the above properties.

The spinel type lithium manganese complex oxide consists essentially of Li, Mn and O, and is represented by a general formula $Li_xMn_2O_y$, where x satisfies $x \geq 1.04$ and y is in the ranges satisfying the following inequarities.

$$y \geq 0.667x+3.333$$

$$y \leq 1.333x+2.667$$

$$y < 0.333x+3.783$$

It is preferable that y is in the ranges satisfying the following inequarities.

$$y \geq x+3$$

$$y \leq 1.333 \times x+2.667$$

$$y < 0.333 \times x+3.783$$

More preferably, y is in the ranges satisfying the following inequarities.

$$y > 1.333 \times x+2.655$$

$$y \leq 1.333 \times x+2.667$$

$$y < 0.333 \times x+3.783$$

According to the present invention, when the lithium amount and oxygen amount of the spinel type lithium manganese complex oxide can satisfy the above various requirements, it is possible to obtain the following effects. Namely, one is able to obtain a large discharge capacity in the cathode active material of the lithium secondary battery. Further, even when the reduction resistance of the material is increased and charge and discharge are carried out at a high temperature, the occurrence of an oxygen defect can be inhibited, and thus it is not necessary to conduct a process of electric charge compensation which is otherwise necessitated by the oxygen defect due to manganese. For this reason, it is possible to maintain the average valence of manganese at a value (3.5 or above) which does not cause the Jahn-Teller distortion, and thus considerably prohibit a large volume change which possibly occurs due to a phase transfer caused by the Jahn-Teller distortion. Therefore, it is possible to obtain a lithium manganese complex oxide having an excellent cycle property of charge and discharge.

By using the above lithium manganese complex oxide as a cathode active material, one can obtain a lithium secondary battery having the above excellent properties.

For the purpose of illustrating the invention, there is shown in the drawings several forms which are presently preferred, it being understood, however, that the invention is not limited to the precise arrangements and instrumentalities shown.

DETAILED DESCRIPTION OF PREFERRED EMBODIMENTS

Figure 1:
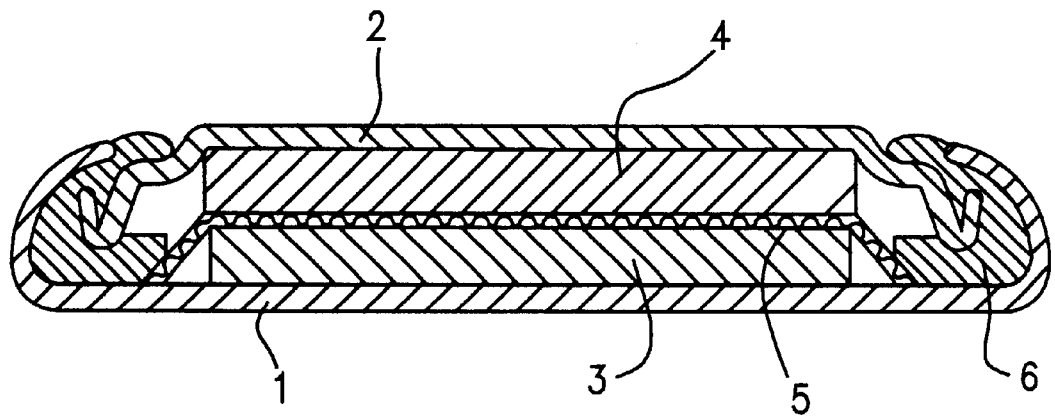
FIG. 1 is a cross sectional view indicating one example of the structure of a lithium secondary battery.

Hereinafter, the preferred embodiments of the present invention are explained in detail with reference to the drawings.

EXAMPLE

At first, in order to synthesize the lithium manganate with the use of a solid phase method, what were prepared are a lithium nitrate and an electrolytic manganese dioxide which can serve as initial starting raw materials for obtaining lithium and manganese for forming the lithium manganate.

Next, the lithium nitrate and the electrolytic manganese dioxide were weighed such that the mole ratio of lithium and manganese will be in a range from 1.03:2 to 1.2:2. Then, these materials were put into a container, and were ground and mixed in roll mill, followed by being sintered for 2 hours at a temperature of 800° C., thereby obtaining a powder material which is the above complex oxide.

After that, the powder material obtained in the above was moved into a sager made of alumina in order to adjust the oxygen defect amount. Then, an atmosphere furnace whose oxygen concentration had been adjusted to a range of 0 to 25% was used, followed by a re-heating treatment at a temperature of 600 to 650° C., thereby obtaining the desired spinel type lithium manganate.

Next, a lithium manganate having a relatively small oxygen defect amount was synthesized by using a spray pyrolysis method rather than a solid phase method.

At first, what were prepared are a lithium nitrate and a manganese formate, which can serve as initial starting raw materials for obtaining lithium and manganese for forming the lithium manganate.

Next, the lithium nitrate and manganese formate were weighed such that the mole ratio of lithium and manganese will be in a range from 1.03:2 to 1.2:2. Then, these materials were put into a container, and 1000 milliliters of water was added thereinto, followed by being stirred and dissolved.

Next, the solution obtained in the above process was blown at a speed of 1200 milliliters per hour by means of a spray from a nozzle into a longitudinally arranged thermal decomposing furnace whose temperature had been adjusted to 700° C., so that the above solution was thermally decomposed, thereby obtaining a powder of complex oxide. Then, in order to adjust the oxygen defect amount, the powder material obtained was moved into a sager made of alumina, an atmosphere furnace whose oxygen concentration had been adjusted to a range of 20 to 100% was used, followed by a re-heating treatment at a temperature of 600 to 700° C., thereby obtaining the desired spinel type lithium manganate.

Next, oxygen amount of the above lithium manganate was calculated with the use of the following method. Namely, a quantitative analysis of lithium was conducted with the use of a method called atomic absorption spectrometry, and a quantitative analysis of manganese was conducted with the use of EDTA chelatometric titration. Further, the valence of manganese was determined with the use of a iodometry method. In this way, the oxygen defect amount was calculated so that the oxygen amount was obtained through the calculation of the oxygen defect amount.

The spinel type lithium manganate obtained in the above process is shown in Table 1. Each sample number having a mark * is used to represent an example not belonging to the scope of the present invention.

TABLE 1

| Sample No. | $Li_xMn_2O_y$ x | y | Synthesizing method | Oxygen concentration (%) | Re-heating temperature (° C.) |
|---|---|---|---|---|---|
| *1 | 1.030 | 4.040 | Spray pyrolysis method | 100 | 700 |
| 2 | 1.040 | 4.053 | Spray pyrolysis method | 100 | 700 |
| 3 | 1.050 | 4.067 | Spray pyrolysis method | 100 | 700 |
| 4 | 1.070 | 4.093 | Spray pyrolysis method | 100 | 700 |
| 5 | 1.100 | 4.133 | Spray pyrolysis method | 100 | 700 |
| *6 | 1.150 | 4.200 | Spray pyrolysis method | 100 | 700 |
| *7 | 1.200 | 4.267 | Spray pyrolysis method | 100 | 700 |
| *8 | 1.030 | 4.035 | Spray pyrolysis method | 40 | 700 |
| 9 | 1.040 | 4.042 | Spray pyrolysis method | 40 | 700 |
| 10 | 1.050 | 4.062 | Spray pyrolysis method | 40 | 700 |
| 11 | 1.070 | 4.089 | Spray pyrolysis method | 40 | 700 |
| 12 | 1.100 | 4.129 | Spray pyrolysis method | 40 | 700 |
| *13 | 1.150 | 4.195 | Spray pyrolysis method | 40 | 700 |
| *14 | 1.200 | 4.261 | Spray pyrolysis method | 40 | 700 |
| *15 | 1.030 | 4.030 | Spray pyrolysis method | 30 | 700 |
| 16 | 1.040 | 4.041 | Spray pyrolysis method | 30 | 700 |
| 17 | 1.050 | 4.054 | Spray pyrolysis method | 30 | 700 |
| 18 | 1.070 | 4.081 | Spray pyrolysis method | 30 | 700 |
| 19 | 1.100 | 4.123 | Spray pyrolysis method | 30 | 700 |
| *20 | 1.150 | 4.190 | Spray pyrolysis method | 30 | 700 |
| *21 | 1.200 | 4.256 | Spray pyrolysis method | 30 | 700 |
| *22 | 1.030 | 4.020 | Solid phase method | 25 | 650 |
| 23 | 1.040 | 4.033 | Solid phase method | 25 | 650 |
| 24 | 1.050 | 4.046 | Solid phase method | 25 | 650 |
| 25 | 1.070 | 4.073 | Spray pyrolysis method | 25 | 650 |
| 26 | 1.100 | 4.113 | Spray pyrolysis method | 25 | 650 |
| *27 | 1.150 | 4.179 | Spray pyrolysis method | 25 | 650 |
| *28 | 1.200 | 4.245 | Spray pyrolysis method | 25 | 650 |
| *29 | 1.030 | 4.000 | Solid phase method | 20 | 600 |
| *30 | 1.040 | 4.013 | Solid phase method | 20 | 600 |
| *31 | 1.050 | 4.026 | Solid phase method | 20 | 600 |
| 32 | 1.070 | 4.052 | Solid phase method | 20 | 600 |
| 33 | 1.100 | 4.092 | Solid phase method | 20 | 600 |
| 34 | 1.150 | 4.158 | Spray pyrolysis method | 20 | 600 |
| *35 | 1.200 | 4.224 | Spray pyrolysis method | 20 | 600 |
| *36 | 1.030 | 3.969 | Solid phase method | 0 | 600 |
| *37 | 1.040 | 3.982 | Solid phase method | 0 | 600 |
| *38 | 1.050 | 3.996 | Solid phase method | 0 | 600 |
| *39 | 1.070 | 4.022 | Solid phase method | 0 | 600 |
| *40 | 1.100 | 4.061 | Solid phase method | 0 | 600 |
| 41 | 1.150 | 4.127 | Solid phase method | 0 | 600 |
| *42 | 1.200 | 4.192 | Solid phase method | 0 | 600 |

A lithium secondary battery was manufactured by using the above powder materials of lithium manganate of the above samples as cathode active material.

The active lithium manganate powder of each sample was mixed with an acetylene black serving as an electrically conductive agent and with a vinylidene fluoride serving as a binder, at a mixing ratio of 100:8:8 parts by weight. Then, N-methyl pyrrolidine was added to the mixture obtained, thereby producing a paste consisting of the cathode active material. The paste was applied to an aluminum foil and was dried thereon, followed by a rolling treatment, thereby obtaining a cathode for use in the lithium secondary battery.

As illustrated in a cross sectional view of a lithium secondary battery shown in FIG. 1, an anode 3 formed of lithium metal and a cathode 4 obtained as explained above are laid one upon another in a manner such that the aluminum foil of the cathode 3 is located on the outer side, with a polypropylene separator 5 disposed therebetween. Then, the cathode 3 was made the lower side and was received into a cathode container 1 formed of stainless steel, with the electrolytic solution penetrating into the separator 5. As the electrolytic solution, used is a mixed solution obtained by dissolving lithium phosphate fluoride in a mixed solution formed by ethylene carbonate and dimethyl carbonate. The opening of the cathode container 1 is sealed by a stainless steel anode plate 2, with an insulating packing 6 interposed therebetween, thereby obtaining a completed lithium secondary battery formed by using various samples of the spinel type lithium manganate shown in Table 1.

Then, 100 charge and discharge cycles tests were carried out on each of the lithium batteries under conditions wherein the charge/discharge current was 0.5 mA/cm$^2$, the charge limit voltage was 4.3 V, the discharge cut off voltage was 3.0 V and the temperature was 60° C., thereby obtaining a capacity variation ratio (charge/discharge cycle characteristic) comparing initial charging capacity prior to the test on the lithium secondary battery with the charging capacity at the beginning of the test and charging capacity after 100 cycles of charge and discharge. The results of the above test are shown in Table 2. For the purpose of comprehensive comparison, the lithium amount x of the present invention is used as a variable so as to obtain the inequalities indicating oxygen amounts, the values of the inequalities are also shown in the Table. Each sample number having a mark * is used to represent an example not belonging to the scope of the present invention. Further, the sample numbers are the same as those in the above Table 1.

TABLE 2

| Sample No. | 0.667x + 3.333 | 1.333x + 2.667 | 0.333x + 3.783 | x + 3 | 1.333x + 2.655 | Discharge capacity (mAh/g) | Capacity change rate (%) |
|---|---|---|---|---|---|---|---|
| *1 | 4.020 | 4.040 | 4.126 | 4.030 | 4.028 | 137 | −10 |
| 2 | 4.027 | 4.053 | 4.129 | 4.040 | 4.041 | 135 | −4 |
| 3 | 4.033 | 4.067 | 4.133 | 4.050 | 4.055 | 135 | −4 |
| 4 | 4.047 | 4.093 | 4.139 | 4.070 | 4.081 | 130 | −4 |
| 5 | 4.067 | 4.133 | 4.149 | 4.100 | 4.121 | 122 | −3 |
| *6 | 4.100 | 4.200 | 4.166 | 4.150 | 4.188 | 109 | −2 |
| *7 | 4.133 | 4.267 | 4.183 | 4.200 | 4.255 | 96 | −2 |
| *8 | 4.020 | 4.040 | 4.126 | 4.030 | 4.028 | 139 | −12 |
| 9 | 4.027 | 4.053 | 4.129 | 4.040 | 4.041 | 136 | −4 |
| 10 | 4.033 | 4.067 | 4.133 | 4.050 | 4.055 | 134 | −4 |
| 11 | 4.047 | 4.093 | 4.139 | 4.070 | 4.081 | 131 | −4 |
| 12 | 4.067 | 4.133 | 4.149 | 4.100 | 4.121 | 123 | −4 |
| *13 | 4.100 | 4.200 | 4.166 | 4.150 | 4.188 | 110 | −3 |
| *14 | 4.133 | 4.267 | 4.183 | 4.200 | 4.255 | 97 | −3 |
| *15 | 4.020 | 4.040 | 4.126 | 4.030 | 4.028 | 138 | −15 |
| 16 | 4.027 | 4.053 | 4.129 | 4.040 | 4.041 | 138 | −7 |
| 17 | 4.033 | 4.067 | 4.133 | 4.050 | 4.055 | 135 | −5 |

TABLE 2-continued

| Sample No. | 0.667x + 3.333 | 1.333x + 2.667 | 0.333x + 3.783 | x + 3 | 1.333x + 2.655 | Discharge capacity (mAh/g) | Capacity change rate (%) |
|---|---|---|---|---|---|---|---|
| 18 | 4.047 | 4.093 | 4.139 | 4.070 | 4.081 | 133 | −5 |
| 19 | 4.067 | 4.133 | 4.149 | 4.100 | 4.121 | 125 | −4 |
| *20 | 4.100 | 4.200 | 4.166 | 41.50 | 4.188 | 112 | −4 |
| *21 | 4.133 | 4.267 | 4.183 | 4.200 | 4.255 | 99 | −3 |
| *22 | 4.020 | 4.040 | 4.126 | 4.030 | 4.028 | 141 | −15 |
| 23 | 4.027 | 4.053 | 4.129 | 4.040 | 4.041 | 138 | −8 |
| 24 | 4.033 | 4.067 | 4.133 | 4.050 | 4.055 | 138 | −6 |
| 25 | 4.047 | 4.093 | 4.139 | 4.070 | 4.081 | 133 | −6 |
| 26 | 4.067 | 4.133 | 4.149 | 4.100 | 4.121 | 128 | −5 |
| *27 | 4.100 | 4.200 | 4.166 | 4.150 | 4.189 | 115 | −5 |
| *28 | 4.133 | 4.267 | 4.183 | 4.200 | 4.255 | 102 | −5 |
| *29 | 4.020 | 4.040 | 4.126 | 4.030 | 4.028 | 147 | −17 |
| *30 | 4.027 | 4.053 | 4.129 | 4.040 | 4.041 | 144 | −12 |
| *31 | 4.033 | 4.067 | 4.133 | 4.050 | 4.055 | 141 | −10 |
| 32 | 4.047 | 4.093 | 4.139 | 4.070 | 4.081 | 136 | −8 |
| 33 | 4.067 | 4.133 | 4.149 | 4.100 | 4.121 | 134 | −7 |
| 34 | 4.100 | 4.200 | 4.166 | 4.150 | 41.88 | 121 | −7 |
| *35 | 4.133 | 4.267 | 4.183 | 4.200 | 4.255 | 108 | −6 |
| *36 | 4.020 | 4.040 | 4.126 | 4.030 | 4.028 | 156 | −24 |
| *37 | 4.027 | 4.053 | 4.129 | 4.040 | 4.041 | 153 | −20 |
| *38 | 4.033 | 4.067 | 4.133 | 4.050 | 4.055 | 150 | −16 |
| *39 | 4.047 | 4.093 | 4.139 | 4.070 | 4.081 | 145 | −13 |
| *40 | 4.067 | 4.133 | 4.149 | 4.100 | 4.121 | 138 | −10 |
| 41 | 4.100 | 4.200 | 4.166 | 4.150 | 4.188 | 131 | −8 |
| *42 | 4.133 | 4.267 | 4.183 | 4.200 | 4.255 | 118 | −7 |

The spinel type lithium manganate represented by a general formula $Li_xMn_2O_y$ was synthesized with the use of a solid phase method or a spray pyrolysis method. Referring to Table 1 and Table 2, as shown in sample numbers 2 to 5, sample numbers 9 to 12, sample numbers 16 to 19, sample numbers 23 to 26, sample numbers 32 to 34 and sample number 41, with the lithium secondary battery employing cathode active material in which lithium amount x and oxygen amount y satisfy the following conditions including $x \geq 1.04$ and $y \geq 0.667x+3.333$, $y \leq 1.333x+2.667$, $y < 0.333x+3.783$, it was found that the oxygen defect was inhibited, the electric discharge capacity has become 120 mAh/g or larger, and the capacity deterioration ratio at a time of charge/discharge cycle under a high temperature may be controlled at a value lower than 10%.

In contrast to the above, among the above various requirements with respect to lithium amount x and oxygen amount y, those not satisfying at least one of $x \geq 1.04$ and $y \geq 0.667x+3.333$, i.e., sample numbers 1, 8, 15, 22, 29, 30, 31, 36, 37, 38, 39, 40, have a capacity deterioration of 10% or more at the time of charge/discharge cycle under a high temperature.

Further, those not satisfying the requirement of $y < 0.333x+3.783$, i.e., sample numbers 6, 7, 13, 14, 20, 21, 27, 28, 35, 42, the electric charge capacity at the charge/discharge cycle does not usually satisfy a requirement of 120 mAh/g which is necessary for forming a secondary battery.

While not belonging to the range of the present invention and although not shown in the samples of Table 1 and Table 2, when the lithium manganate was synthesized with the use of a solid phase method or a spray pyrolysis method, with regard to those whose oxygen amount y is larger than $1.333 \times x+2.667$, it was impossible to obtain the desired compound no matter what conditions were used to carry out the re-heating treatment.

Further, among lithium manganates synthesized in the above process, in which x and y satisfy the following conditions including $x \geq 1.04$ and $y \geq x+3$, $y \leq 1.333x+2.667$, $y < 0.333x+3.783$, it was found that a capacity deterioration ratio at the time of charge/discharge cycle had been more effectively inhibited than that having the same lithium amount but satisfying the following requirements including $x \geq 1.04$ and $y \geq 0.667x+3.333$, $y \leq 1.333x+2.667$, $y < 0.333+3.783$.

Namely, when the lithium amount x was 1.040, sample number 23 had a capacity deterioration ratio of 8%, while sample numbers 2, 9, 16 each had its capacity deterioration ratio controlled at 7% or lower. Further, when the lithium amount x was 1.050, sample number 24 had a capacity deterioration ratio of 6%, while sample numbers 3, 10, 17 each had its capacity deterioration ratio controlled at 5% or lower. Moreover, when the lithium amount x was 1.070, sample number 32 had a capacity deterioration ratio of 8%, while sample numbers 4, 11, 18, 25 each had its capacity deterioration ratio controlled at 6% or lower. Further, when the lithium amount x was 1.100, sample number 33 had a capacity deterioration ratio of 7%, while sample numbers 5, 12, 19, 26 each had its capacity deterioration ratio controlled at 5% or lower. Moreover, when the lithium amount x was 1.150, sample number 41 had a capacity deterioration ratio of 8%, while sample number 34 had its capacity deterioration ratio controlled at 7% or lower.

Further, as shown in sample numbers 2 to 5, sample numbers 9 to 12 and sample number 19, with regard to the lithium secondary battery employing cathode active material in which lithium manganate satisfy the following conditions including $x \geq 1.04$ and $y > 1.333x+2.655$, $y \leq 1.333x+2.667$, $y < 0.333x+3.783$, it was found that a capacity deterioration ratio at a time of charge/discharge cycle may be controlled at a value of 3% to 4% or lower.

Figure 2:
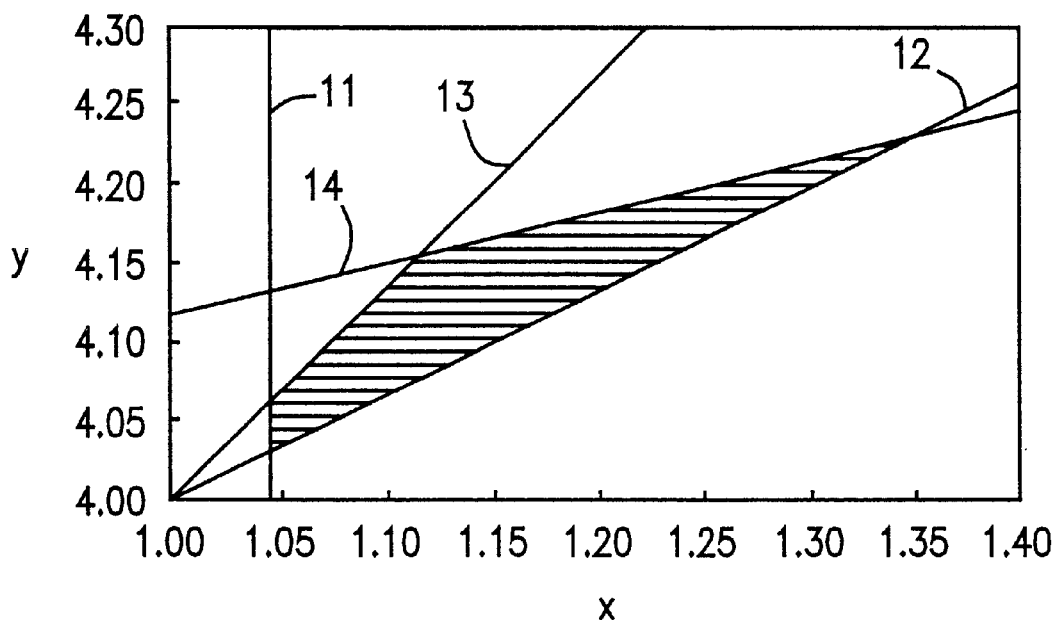
FIG. 2 is a graph indicating an area showing lithium and oxygen amounts of the spinel type lithium manganese complex oxide.
Figure 3:
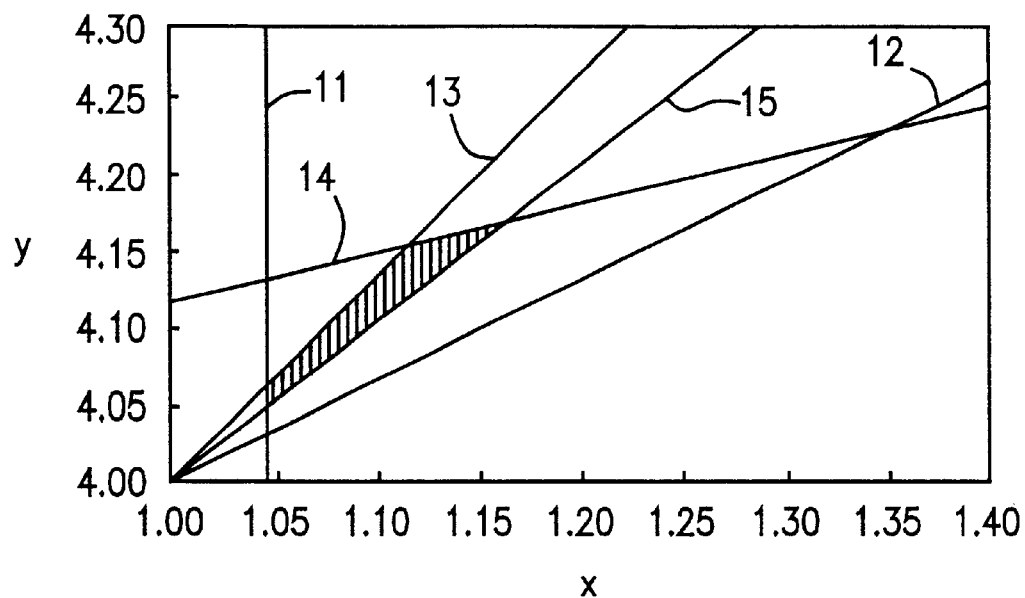
FIG. 3 is a graph indicating an area showing lithium amount and oxygen amounts of the spinel type lithium manganese complex oxide.
Figure 4:
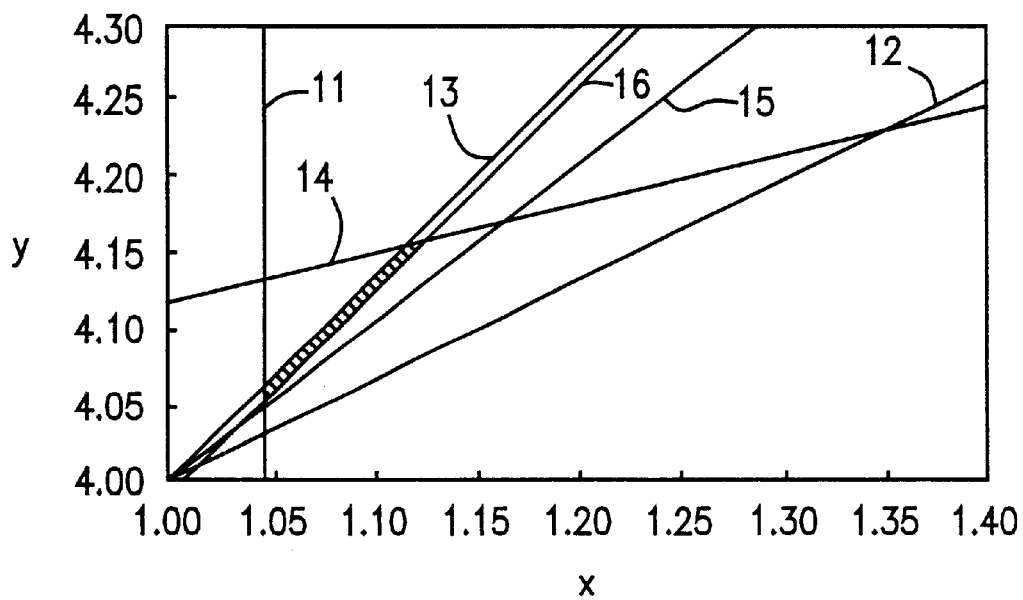
FIG. 4 is a graph indicating an area showing lithium amount and oxygen amounts of the spinel type lithium manganese complex oxide.

Next, the lithium amount x of the spinel type lithium manganate represented by a general formula $Li_xMn_2O_y$ was represented by a horizontal axis and its oxygen amount y is represented by a vertical axis, thereby forming the graphs of FIGS. 2 to 4 which are used to explain the reasons as to why the lithium amount x and the oxygen amount y are limited in the present invention.

FIG. 2 is used to indicate the ranges of lithium amount x and oxygen amount y of a spinel type lithium manganate are in the broad range of the present invention.

A line 11 and the range on the right side thereof have already been confirmed by experiment and are used to indicate the lithium amount x capable of obtaining an excellent charge/discharge cycle property under a high temperature. In this way, it was able to obtain a conditional inequarity indicating the spinel type lithium manganate represented by $Li_xMn_2O_y$ in which x>1.04.

Further, a line 12 and the range on the upper side thereof have already been confirmed by experiment and are used to indicate the lithium amount x and the oxygen amount y capable of obtaining an excellent charge/discharge cycle property under a high temperature. In this way, it was able to obtain a conditional inequarity indicating the spinel type lithium manganate represented by $Li_xMn_2O_y$ in which y≧0.667x+3.333.

Further, a line 13 and the range on the lower side thereof have been obtained by means of calculation using a theoretical inequarity, and are used to indicate a lithium amount x and an oxygen amount y capable of obtaining the lithium manganate which will not cause an oxygen defect even under a high temperature. In this way, it was able to obtain a conditional inequarity indicating the spinel type lithium manganate represented by $Li_xMn_2O_y$ in which y≦1.333x+2.667.

Further, the range on the lower side of a line 14 (however, not including the line 14 itself) have been obtained by means of a calculation using a theoretical inequarity, and are used to indicate a lithium amount x and an oxygen amount y theoretically capable of obtaining a charge capacity of 120 mAh/g which is necessary for the secondary battery. In this way, it was able to obtain a conditional inequarity indicating the spinel type lithium manganate represented by $Li_xMn_2O_y$ in which y<0.333x+3.783.

The area surrounded by lines 11 to 14 (however, without line 14 included) indicates the lithium amount and the oxygen amount, both satisfying the above four requirements of the spinel type lithium manganese complex oxide represented by a general formula $Li_xMn_2O_y$.

Next, FIG. 3 is used to indicate the lithium amount x and the oxygen amount y of the spinel type lithium manganese complex oxide where y=x+3.

Line 15 and the area above the line 15 have been confirmed by experiment, and indicate that although these areas show the same lithium amounts, they indicate an oxygen amount y which has a more effective charge/discharge cycle characteristic. In this way, obtained was a conditional inequarity indicating the spinel type lithium manganate represented by $Li_xMn_2O_y$ in which y≧x+3.

The area surrounded by line 11 and lines 13 to 15 (but not on line 14 itself) are used to indicate the lithium amount and the oxygen amount, both satisfying the above four requirements of the spinel type lithium manganese complex oxide represented by a general formula $Li_xMn_2O_y$ and y=x+3.

FIG. 4 indicates the lithium amount and the oxygen amount of the spinel type lithium manganese complex oxide when y>1.333x+2.655.

The area above line 16 (but not on line 16 itself) was confirmed by experiment, and is used to indicate a lithium amount and an oxygen amount which have the most effective charge/discharge cycle characteristic under high temperature. Since the lithium amount x and the oxygen amount y are in this area, the oxygen defect can be minimized under high temperature, thus effectively prohibiting a Jahn-Teller phase transfer. In this way, one can obtain a conditional inequarity indicating the spinel type lithium manganate represented by a general formula $Li_xMn_2O_y$ in which y>1.333x+2.655.

The area surrounded by line 11, line 13, line 14 and line 16 (with line 14 and line 16 themselves not included) are used to indicate the lithium amount x and the oxygen amount y both satisfying the above four requirements of the spinel type lithium manganese complex oxide represented by a general formula $Li_xMn_2O_y$ and y>1.333x+2.655.

As described in the above, the present invention is a composition of a spinel type lithium manganese complex oxide represented by a general formula $Li_xMn_2O_y$. By limiting the lithium amount and oxygen amount, it is possible to obtain a spinel type lithium manganese complex oxide having an increased charge/discharge capacity and an excellent charge/discharge cycle characteristic under a high temperature.

While preferred embodiments of the invention have been disclosed, various modes of carrying out the principles disclosed herein are contemplated as being within the scope of the following claims. Therefore, it is understood that the scope of the invention is not to be limited except as otherwise set forth in the claims.

What is claimed is:

1. A spinel lithium manganese complex oxide consisting essentially of Li, Mn and O, and represented by the formula $Li_xMn_2O_y$, where x≧1.04 and y simultaneously satisfies $$y≧0.667x+3.333$$

$$y<1.333x+2.667$$

$$y<0.333x+3.783.$$

2. The spinel lithium manganese complex oxide according to claim 1, wherein y further satisfies y≧x+3.

3. The spinel lithium manganese complex oxide according to claim 2, wherein y further satisfies y≧1.333x+2.655.

4. The spinel lithium manganese complex oxide according to claim 3, wherein x is 1.05 to 1.15.

5. The spinel lithium manganese complex oxide according to claim 2, wherein x is 1.05 to 1.15.

6. The spinel lithium manganese complex oxide according to claim 1, wherein x is 1.05 to 1.15.

7. A lithium secondary battery comprising an anode and a cathode, wherein the cathode comprises the spinel lithium manganese complex oxide of claim 6.

8. A lithium secondary battery comprising an anode and a cathode, wherein the cathode comprises the spinel lithium manganese complex oxide of claim 5.

9. A lithium secondary battery comprising an anode and a cathode, wherein the cathode comprises the spinel lithium manganese complex oxide of claim 4.

10. A lithium secondary battery comprising an anode and a cathode, wherein the cathode comprises the spinel lithium manganese complex oxide of claim 3.

11. A lithium secondary battery comprising an anode and a cathode, wherein the cathode comprises the spinel lithium manganese complex oxide of claim 2.

12. A lithium secondary battery comprising an anode and a cathode, wherein the cathode comprises the spinel lithium manganese complex oxide of claim 1.

* * * * *